Feb. 8, 1966 B. T. MATTHIAS 3,234,494

FERROMAGNETIC COMPOUND AND DEVICES INCLUDING ELEMENTS THEREOF

Filed July 28, 1961 2 Sheets-Sheet 1

INVENTOR
B. T. MATTHIAS
BY George S. Indig
ATTORNEY

FERROMAGNETIC COMPOUND AND DEVICES INCLUDING ELEMENTS THEREOF

Filed July 28, 1961 2 Sheets-Sheet 2

INVENTOR
B. T. MATTHIAS
BY George S. Indig
ATTORNEY

United States Patent Office 3,234,494

Patented Feb. 8, 1966

3,234,494

FERROMAGNETIC COMPOUND AND DEVICES INCLUDING ELEMENTS THEREOF

Bernd T. Matthias, Berkeley Heights, N.J., assignor to Bell Telephone Laboratories, Incorporated, New York, N.Y., a corporation of New York Filed July 28, 1961, Ser. No. 127,634
4 Claims. (Cl. 336—221)

This invention relates to the ferromagnetic compound europium oxide (EuO) and to circuit elements including bodies thereof.

It has been discovered that the compound EuO is ferromagnetic at temperatures below its Curie point of approximately 77 degrees Kelvin. Measurements verify the theoretically expected saturation of 7 Bohr magnetons. At temperatures below its Curie point, based on a density of about 8.25, its moment $4\pi M$ is equal to 24,100 gauss per cubic centimeter. This value compares with a moment of about 21,700 for iron and about 25,000 for metallic gadolinium.

Of perhaps greater significance from a device standpoint than its comparison with conducting ferromagnetic substances is the fact that EuO is a dielectric material. Measurements indicate resistivities of the order of $10^9$ to $10^{10}$ ohm-cm. As a magnetic insulator, EuO may be compared with the usual ferrimagnetic materials such as yttrium-iron garnet which characteristically have magnetic moments of the order of 2,500 gauss per cubic centimeter over the temperature range below 77 degrees Kelvin.

Crystallographic studies indicate a NaCl structure and are consistent with extremely high permeability and narrow line width. In its pure form, EuO has almost negligible hysteresis, although the usual techniques can be used for giving it loop characteristics.

EuO is of interest in the cryogenic temperature range where its combination of insulating and high saturation properties makes possible miniaturization of conventional magnetic and microwave devices, as well as suggesting a host of devices whose realization has awaited development of a material having the characteristics of EuO.

A description of the invention is facilitated by reference to the drawing, in which:

FIG. 1, on coordinates of magnetization and temperature in degrees Kelvin, shows the relationship between magnetic moment and temperature of EuO below the Curie point;

Figure 1:
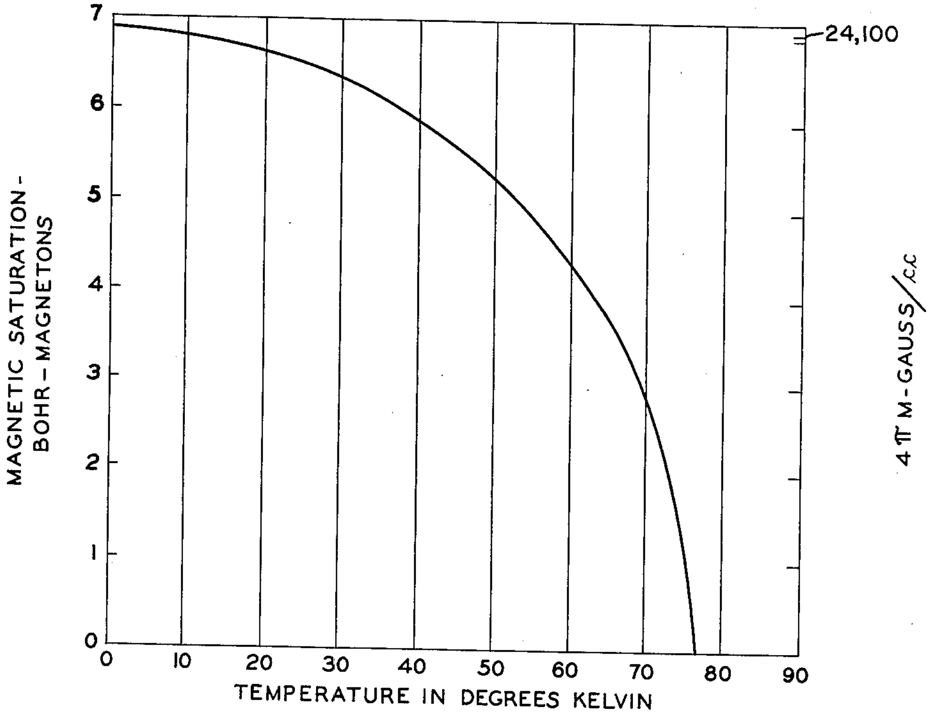

Referring again to FIG. 1, the plot shows the relationship between magnetic moment and temperature. Abscissa units are in degrees Kelvin. Dual ordinate units are shown, magnetic saturation in Bohr magnetons on the left and magnetic moment ($4\pi M$) in gauss per cubic centimeter on the right. The curve form is traditional and shows a peak of approximately 7 Bohr magnetons, or 24,100 gauss per cubic centimeter, at zero degrees Kelvin, and zero magnetization at the Curie temperature of 77 degrees Kelvin.

Figure 2:
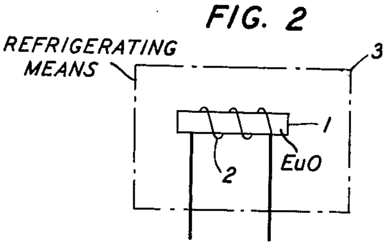
FIG. 2 is a front elevational view of one type of device utilizing a core of EuO.

FIG. 2 depicts a conventional solenoid structure including core 1 of EuO and winding 2. Refrigerating means 3 is depicted schematically and may represent any suitable means for refrigerating body 1 to a temperature at or below its Curie point of 77 degrees Kelvin. The structure shown can, of course, serve any of many diverse purposes. For example, it may be used as a magnetic core delay line or an antenna rod.

Figure 3:
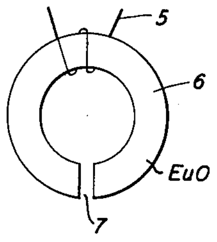
FIG. 3 is a plan view of a second type of device utilizing a core of the magnetic material of this invention.

FIG. 3 depicts a toroidal inductor including winding about toroidal core 6, the latter having an air gap 7.

Figure 4:
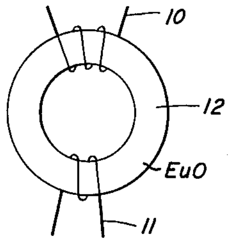
FIG. 4 is a plan view of yet another type of device utilizing a core of EuO.

The closed core transformer of FIG. 4 is a device of conventional design and includes windings 10 and 11 about EuO core 12. Depending upon whether the desired effect is a step-down or step-up in voltage, winding 10 or 11 successively is considered as primary. Due to the high magnetic moment, the good insulating properties and the virtual absence of loss due to eddy current, transformers of the type depicted are of considerable interest in circuits utilizing semiconducting memory elements or other cryogenic devices.

Figure 5:
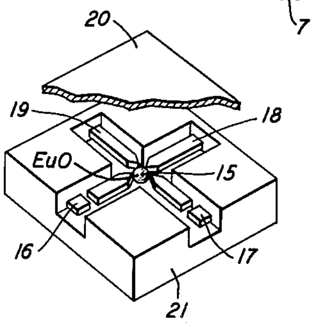
FIG. 5 is a perspective view, partly in section, of a power limiter utilizing a body of EuO.

The device depicted in FIG. 5 may be considered as a filter-gyrator-limiter of the type disclosed by W. De Grasse in the February 1959 issue of Electrical Manufacturing, at page 61 et seq. The device, which is there described in greater detail, may operate as a limiter and is dependent upon the power saturation of spherical element 15, here made of EuO, which serves as a nonreciprocal coupling element for strip lines 16 and 17, terminating at 18 and 19, which may be considered as input and output in the order recited. This device, characteristic of strip transmission lines, is electrically equivalent to a coaxial line and includes conductive paths 20 and 21 in addition to the functional elements. Electrical insulation required to isolate elements 16, 17, 18, and 19 from paths 20 and 21 is shown. EuO is particularly suitable for use in a "De Grasse-type limiter" by reason of its very low loss.

Figure 6:
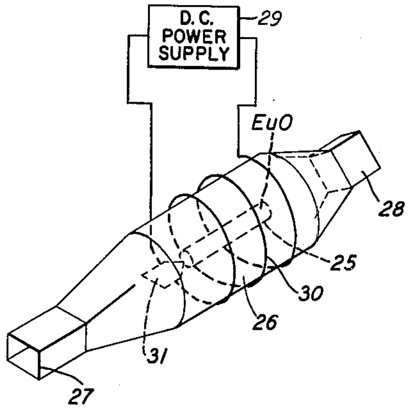
FIG. 6 is a perspective view of a microwave isolator utilizing Faraday rotation in a rod of EuO.

The device of FIG. 6 is characteristic of a class of Faraday rotation isolators. The particular device depicted utilizes EuO element 25 concentrically placed within the circular waveguide 26, which latter is equipped with ports 27 and 28, in this instance the one rotated 45 degrees with respect to the other. Element 25 is magnetically saturated by the magnetic field resulting from D.-C. current supplied by supply 29 and travelling through winding 30, the latter encircling that portion of guide 26 enclosing the magnetic element 25. Absorbing vane 31 serves the function of attenuating wave energy so as to minimize rereflection. The device is dependent for its operation upon the nonreciprocity of the gyromagnetic effect. The plane of polarization of a wave travelling through the guide in a given direction, for example from 27 to 28, experiences a 45 degree rotation through element 25 and so emerges from port 28. A wave travelling in the reverse direction is rotated at 45 degrees in the same direction and so is oriented at 90 degrees to the major axis of port 27 and cannot be transmitted.

Figure 7:
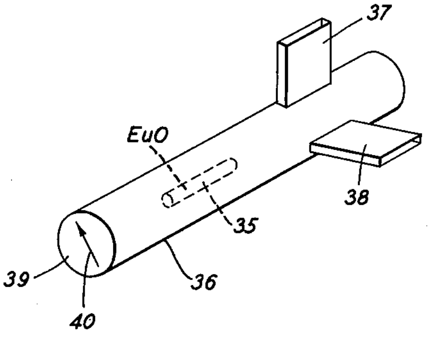
FIG. 7 is a perspective view of a waveguide switch utilizing a body of the compound herein.

FIG. 7 diagrammatically depicts a switching device also based on the gyromagnetic principle. The particular switch shown may operate as a single-pole double-throw device and consists of EuO element 35 within circular guide 36, the latter equipped with rectangular waveguides 37 and 38 disposed at 90 degrees. Element 35 is designed to produce 45 degree rotation of the plane of polarization of a wave passing therethrough at saturation. Depending upon the direction of the saturating field produced by means not shown but which may be similar to that shown in FIG. 6, the rotation of the plane of polarization of the electromagnetic energy entering at 39 is clockwise or counterclockwise. For the polarization shown schematically by arrow 40, a counterclockwise 45 degree rotation sends the energy to guide 37, while a clockwise 45 degree rotation switches the energy to guide 38.

Figures 8, 9:
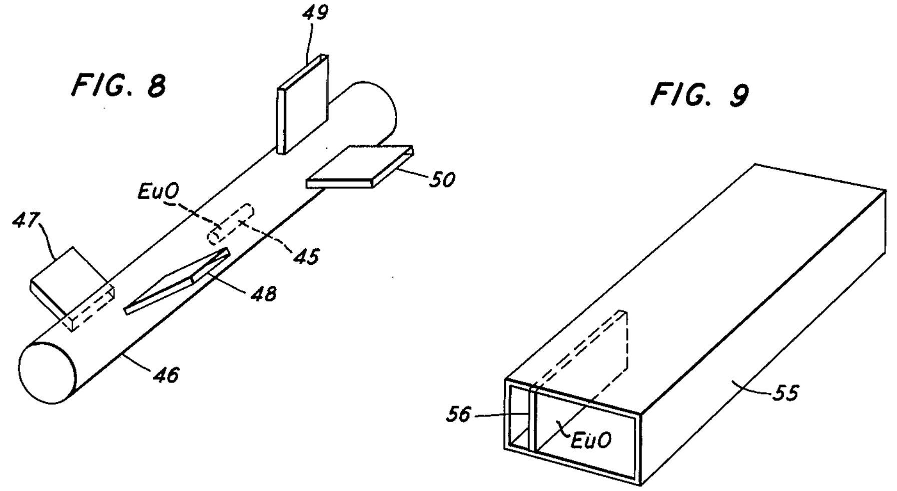
FIG. 8 is a perspective view of a circulator utilizing Faraday rotation in an EuO element.
FIG. 9 is a perspective view of a device utilizing a rectangular waveguide containing a body of EuO.

FIG. 8 depicts a microwave circulator and consists of EuO element 45 within a circular guide 46, which is equipped with two pairs of rectangular guides 47–48 and 49–50, each pair being at right angles and the second pair displaced from the first at an angle of 45 degrees. For the angular relationships shown, and assuming 45 degree positive rotation in element 45, power incident through waveguide 48 is rotated by element 45 and is accepted by guide 50. The wave incident from guide 50 is accepted by guide 47, the wave incident at guide 47 is accepted by guide 49, and the wave incident at guide 49 will emerge at guide 48.

The device of FIG. 9 includes a rectangular guide 55 containing EuO element 56. Microwave elements using Such rectangular guides may serve various purposes which may be based on field-controlled effects. When the magnetic element is placed off the central axis, as shown, various nonreciprocal phase and attenuation characteristics result.

For simplicity no one of FIGS. 3 through 9 shows the refrigerating means which may in its simplest form be a Dewar flask of helium, hydrogen or nitrogen which is, of course, necessary to maintain the active body of EuO at or below its Curie point of 77 degree Kelvin.

The microwave devices of FIGS. 6 through 9 are more fully described in various standard texts including Solid State Magnetic and Dielectric Devices, edited by H. W. Katz, John Wiley and Sons, 1959, these devices being described, respectively, at pages 289, 291, 291, and 293. et seq.

Although FIGS. 6 through 9 have been described in terms of microwave energy, they may be considered as representative of devices operating at higher frequencies, including those of the light spectrum. Since EuO is transparent to at least some of the wavelengths included in the light spectrum, devices including elements of this material may operate as light valves or modulators or serve any of the other purposes set forth for example in U.S. Patent 2,974,568, issued March 14, 1961 in the name of J. F. Dillon, Jr.

EuO is, of course, not a commercially available material, and it was found necessary to prepare the samples on which the indicated measurements were made. The compound is easily produced from the related and commercially available oxide $Eu_2O_3$ by adding the amount of elemental Eu required to bring the composition to the EuO stoichiometry and simply heating for a time and at a temperature necessary to bring about complete reaction. Experimentally, it has been found that heating a powdered mix for a period of about eight hours at a temperature of the order of 1190 degrees centigrade is sufficient, an X-ray powder determination indicating at the end of this period that the material was single-phase EuO. Samples have been prepared in this manner in sealed quartz tubes, no precautions being taken to exclude air. However, from the chemistry of the system, the added precaution of firing in an inert atmosphere such as helium may be desirable.

All measurements indicated were made on pressed powder mixes. Although the advent of a procedure for growing single crystals is expected to play a beneficial part in the commercial development of the material, its nearly isotropic nature indicates the advantages gained by the use of single crystals will not be as great relative to the polycrystalline material as would be expected on the basis of experience gained with the conventional ferrimagnetic materials.

It has been noted that the magnetic permeability of EuO is high and that the material is essentially lacking in a direction of easy magnetization. Hysteresis loop characteristics essential to use in a memory device may, however, be introduced by the use of contaminants in the manner known to those familiar with square loop ferrite materials. In accordance with such experience, it is expected that square loop characteristics will result from the incorporation of small amounts (of the order of one-tenth of one percent of terbium or other rare earths).

As is well known, other reasons may exist for including other ingredients together with the EuO of this invention. For example, although the invention is set forth in terms of the pure composition EuO, the desire, for example, to decrease its magnetic moment on a volume basis or to facilitate fabrication may dictate the incorporation of various fillers or the chemical substitution of nonmagnetic elements.

The invention has, of necessity, been described in terms of a limited number of embodiments. As will be recognized by any person skilled in the art, a multitude of other embodiments are suggested by the material characteristics which have been set forth. Examples of such embodiments are paramagnetic amplifiers of the Suhl type and travelling wave counterparts (see volume 11, Physics Today, No. 9, page 28 et seq., September 1958; 46 Proceedings of the Institute of Radio Engineers, pages 700 to 706, April 1958; and 29 Journal of Applied Physics, pages 1347 to 1457, September 1958) as well as frequency converters and multipliers and magnetic probes. All such embodiments are considered to be part of the invention herein.

What is claimed is:

1. Circuit element comprising a body consisting essentially of europium oxide (EuO) in its ferromagnetic state together with means for maintaining the said body at a temperature below 77 degrees Kelvin.

2. Element of claim 1 in which there is at least one electrically conductive path associated with the said body.

3. Element of claim 2 in which the said path consists essentially of a plurality of windings about the said body.

4. Element of claim 2 in which there are at least two electrically conducting paths associated with the said body.

References Cited by the Examiner

UNITED STATES PATENTS

| | | | |
|---|---|---|---|
| 2,866,842 | 12/1958 | Matthias | 333—99 |
| 2,922,125 | 1/1960 | Siebl | 333—24 |
| 2,974,568 | 3/1961 | Dillon | 333—99 |
| 2,981,688 | 4/1961 | Albers-Schonberg | 333—24.3 |
| 2,994,045 | 7/1961 | Van Uitert | 333—24.3 |
| 3,016,495 | 1/1962 | Tien | 333—24 |
| 3,016,497 | 1/1962 | Kostelnick | 333—81 |
| 3,050,643 | 8/1962 | Connell et al. | 333—99 |

OTHER REFERENCES

De Grasse: Journal of Applied Physics, April 1959 (supplement to vol. 30, No. 4), pages 155–160 entitled "Low Loss Gyromagnetic etc."

Henry: Journal of Applied Physics Supplement to vol. 30, No. 4, April 1959, pages 99–100 entitled "Saturation Magnetization etc."

HERMAN KARL SAALBACH, *Primary Examiner.*